(12) United States Patent
Ohmori et al.

(10) Patent No.: US 12,340,334 B2
(45) Date of Patent: Jun. 24, 2025

(54) SKILL INDEX PROVISION DEVICE, SKILL INDEX PROVISION METHOD, AND PROGRAM

(71) Applicant: NIPPON TELEGRAPH AND TELEPHONE CORPORATION, Tokyo (JP)

(72) Inventors: Kumiko Ohmori, Tokyo (JP); Yuki Shiroma, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 712 days.

(21) Appl. No.: 17/277,685

(22) PCT Filed: Oct. 23, 2019

(86) PCT No.: PCT/JP2019/041508
§ 371 (c)(1),
(2) Date: Mar. 18, 2021

(87) PCT Pub. No.: WO2020/085374
PCT Pub. Date: Apr. 30, 2020

(65) Prior Publication Data
US 2022/0036280 A1 Feb. 3, 2022

(30) Foreign Application Priority Data
Oct. 24, 2018 (JP) .................................. 2018-200332

(51) Int. Cl.
*G06Q 10/0639* (2023.01)
*G06N 20/00* (2019.01)

(52) U.S. Cl.
CPC ....... *G06Q 10/06398* (2013.01); *G06N 20/00* (2019.01)

(58) Field of Classification Search
None
See application file for complete search history.

(56) References Cited

U.S. PATENT DOCUMENTS 8,126,133 B1 * 2/2012 Everingham .. G06Q 10/063112
379/265.06
9,729,403 B1 * 8/2017 Rabe ...................... H04L 41/22
(Continued)

FOREIGN PATENT DOCUMENTS

JP H08-055103 A 2/1996
JP 2005293261 A 10/2005
(Continued)

OTHER PUBLICATIONS

Snow, Rion, et al. "Cheap and fast-but is it good? evaluating non-expert annotations for natural language tasks." Proceedings of the 2008 conference on empirical methods in natural language processing. 2008 (Year: 2008).*
(Continued)

*Primary Examiner* — Darlene Garcia-Guerra

(57) ABSTRACT

A skill index provision device for calculating a skill index of a user based on a user's operation log, include a memory unit for saving the user's operation log, an operation log related to an accuracy of operating a key performed by the user; and a skill index calculation unit for calculating the skill index based on a dispersion value of each of the operation logs related to a speed of operating the key.

8 Claims, 13 Drawing Sheets

| SKILL INDEX | UI TYPE | UI FEATURE (TASK THAT RECEIVES ORDER INFORMATION FROM CUSTOMER AND INPUTS ITS CONTENTS) |
|---|---|---|
| 1 | UI1 | UNDERSTANDING OF BUSINESS TASK (EXPLANATION OF MEANING OF INPUT ITEM) |
| 2 | UI2 | IMPROVEMENT ON OPERATION ACCURACY (INPUT EXAMPLE, INTERRELATIONSHIP WITH ANOTHER INPUT) |
| 3 | UI3 | IMPROVEMENT ON OPERATION EFFICIENCY (INPUT AID, CHANGE OF INPUT ORDER) |

(56) References Cited

U.S. PATENT DOCUMENTS

| | | | |
|---|---|---|---|
| 10,540,072 B2* | 1/2020 | Merkin | G06Q 10/0639 |
| 2004/0024569 A1* | 2/2004 | Camillo | G09B 7/02 |
| | | | 702/182 |
| 2008/0227064 A1* | 9/2008 | Yoon | G09B 23/28 |
| | | | 434/236 |
| 2009/0106312 A1* | 4/2009 | Breslau | G06F 16/9535 |
| 2010/0158238 A1* | 6/2010 | Saushkin | G10L 25/48 |
| | | | 379/265.12 |
| 2011/0154216 A1* | 6/2011 | Aritsuka | G06F 9/44505 |
| | | | 715/745 |
| 2011/0161139 A1* | 6/2011 | Maheshwari | G06Q 10/06398 |
| | | | 705/321 |
| 2014/0114730 A1* | 4/2014 | Deshpande | G06Q 10/06 |
| | | | 705/7.42 |
| 2014/0165027 A1* | 6/2014 | Herbert | G06F 8/10 |
| | | | 717/101 |
| 2015/0287190 A1* | 10/2015 | Kim | G16H 20/40 |
| | | | 382/128 |
| 2016/0191519 A1* | 6/2016 | Surendrakumar | H04L 63/105 |
| | | | 726/7 |
| 2016/0196534 A1* | 7/2016 | Jarrett | G06Q 50/2057 |
| | | | 705/321 |
| 2018/0173501 A1* | 6/2018 | Srinivasan | G06Q 10/063112 |
| 2019/0102741 A1* | 4/2019 | Gupta | G06Q 10/0635 |
| 2019/0130511 A1* | 5/2019 | Davier | A61B 5/486 |
| 2019/0213915 A1* | 7/2019 | Tan | G06F 40/205 |

FOREIGN PATENT DOCUMENTS

| | | |
|---|---|---|
| JP | 2006251917 A | 9/2006 |
| JP | 2012-128547 A | 7/2012 |
| JP | 2014232377 A | 12/2014 |
| JP | 2015-041317 A | 3/2015 |

OTHER PUBLICATIONS

Reinhardt, Kai, and Klaus North. "Transparency and transfer of individual competencies—a concept of integrative competence management." J. Univers. Comput. Sci. 9.12 (2003): 1372-1380 (Year: 2003).*

Sure, York, Alexander Maedche, and Steffen Staab. "Leveraging Corporate Skill Knowledge—From ProPer to OntoProPer." PAKM. 2000 (Year: 2000).*

Van Laar, Ester, et al. "The relation between 21st-century skills and digital skills: A systematic literature review." Computers in human behavior 72 (2017): 577-588 (Year: 2017).*

Yoshihito Nakamura, "A Study of dynamic Judging Method of User Level for User Adaptive Interface System", Lecture proceedings (4) of the 49th (Late 1994) National Convention, Software reliability and security, Sep. 20, 1994, pp. 4_343 to 4_344.

* cited by examiner

FIG.4

| OPERATOR ID | SKILL INDEX | TASK ID | EVENT ID | LOG INFORMATION (TIME INTERVAL OF KEY OPERATION) |
|---|---|---|---|---|
| IDa | 1 | Ta | Q1 | t1,t2,t3 |
| | | | Q2 | t5,t6 |
| | | | Q3 | t7,t8,t9,t10 |

FIG.5

| OPERATOR ID | TASK ID | SKILL INDEX |
| --- | --- | --- |
| IDa | Ta | 4 |
| IDa | Tb | 2 |
| IDb | Ta | 3 |

FIG.9

|  | 50% VALUE | 90% VALUE |
|---|---|---|
| BEGINNER | 3.7 SECOND | 13.5 SECOND |
| SKILLED PERSON | 2 SECOND | 4 SECOND |

FIG.10

|  | AVERAGE VALUE | DISPERSION VALUE | SKILL INDEX |
|---|---|---|---|
| BEGINNER | 5.8 | 11.8 | 1 |
| SKILLED PERSON | 2.4 | 4.2 | 5 |

FIG.14

| SKILL INDEX | UI TYPE | UI FEATURE (TASK THAT RECEIVES ORDER INFORMATION FROM CUSTOMER AND INPUTS ITS CONTENTS) |
|---|---|---|
| 1 | UI1 | UNDERSTANDING OF BUSINESS TASK (EXPLANATION OF MEANING OF INPUT ITEM) |
| 2 | UI2 | IMPROVEMENT ON OPERATION ACCURACY (INPUT EXAMPLE, INTERRELATIONSHIP WITH ANOTHER INPUT) |
| 3 | UI3 | IMPROVEMENT ON OPERATION EFFICIENCY (INPUT AID, CHANGE OF INPUT ORDER) |

# SKILL INDEX PROVISION DEVICE, SKILL INDEX PROVISION METHOD, AND PROGRAM

CROSS-REFERENCE TO RELATED APPLICATIONS

This application is a U.S. 371 Application of International Patent Application No. PCT/JP2019/041508, filed on 23 Oct. 2019, which application claims priority to and the benefit of JP Application No. 2018-200332, filed on 24 Oct. 2018, the disclosures of which are hereby incorporated herein by reference in their entireties.

TECHNICAL FIELD

The present invention is directed to an overall operation of an operator in an operation work task for performing an operation based on a user request, and relates to a technology that provides an appropriate support for the operator. The operation work task also includes a case where a work is divided v among multiple persons.

BACKGROUND ART

Prior art related to an operator operation interface for displaying information to an operator who performs an I/O operation using a computer or the like includes, for example, a technology disclosed in Patent Document 1 and a technology disclosed in Patent Document 2. The "operator operations interface" may be referred to as an "interface", "user interface", "UI", or the like. Hereinafter, "interface" is mainly used.

Patent Document 1 discloses a technique for determining user proficiency in an interface by objectively determining an operator's proficiency at a time interval for key operation.

BACKGROUND ART DOCUMENTS

Patent Documents

[Patent Document 1]
Japanese Laid-open Patent Application No. 08-55103

SUMMARY OF INVENTION

Problem to be Solved by the Invention

Input and output operations by an operator require a time and an education workload by a skilled person, and even the skilled person may encounter a risk of an incident due to an error in an input. In addition, because of the need to improve a work task efficiency, the operator is required to perform a quick and accurate input and output operation.

In Patent Document 1, knowledge of an operator is obtained from an operation log. In Patent Document 1, the proficiency is judged by a time interval for key operation. In practice, however, the time interval for key operation may not necessarily depend on the proficiency of the operator's input and output operations. In such a case, the proficiency may not be estimated accurately.

The present invention is made in view of the above points, and it is an object of the present invention to provide a technique for accurately estimating user's proficiency based on the user's operation log.

Means for Solving Problems

A disclosed technique provides a skill index provision device for calculating a skill index of a user based on an operation log of the user, the skill index provision device including a memory unit for saving the operation log of the user, and a skill index calculation unit for calculating the skill index based on the operation log related to an accuracy of operating a key depressed by the user and a dispersion value of each of the operation log related to a speed of operating a key.

Effects of the Invention

The disclosed technique provides a technique for accurately estimating user's proficiency based on an operation log of a user.

BRIEF DESCRIPTION OF DRAWINGS

FIG. 4 illustrates an example of data saved in a log file storage unit.

FIG. 5 is a diagram illustrating an example of data stored in a skill index storage unit.

FIG. 9 illustrates an example of the cumulative probability.

FIG. 10 is a diagram illustrating an example of judging the skill index.

FIG. 14 is a diagram illustrating an example of data stored in a UI generation unit.

MODE FOR CARRYING OUT THE INVENTION

Figure 1:
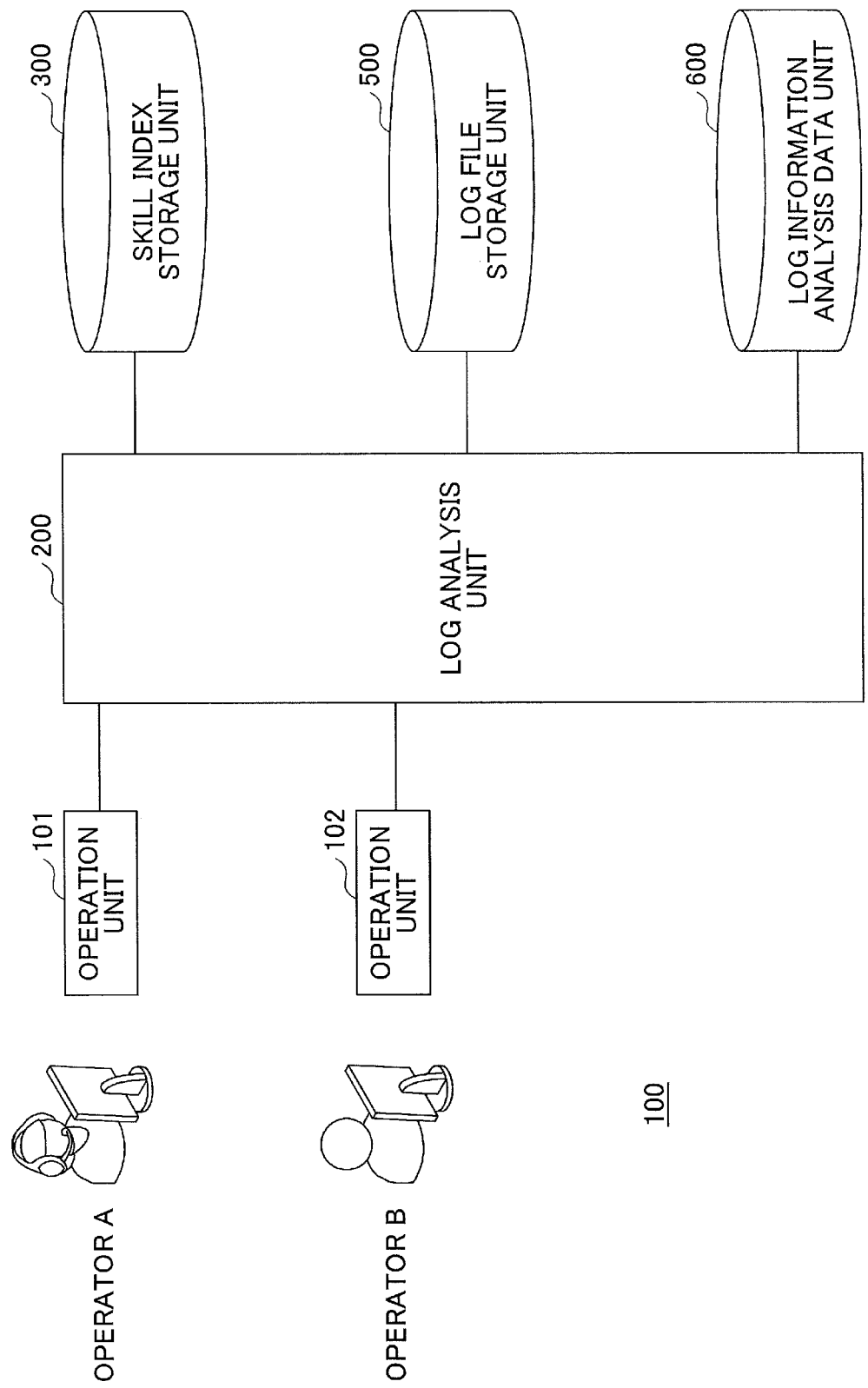
FIG. 1 is a schematic view of illustrating a skill index provision device according to an embodiment of the present invention.

Hereinafter, embodiments of the present invention (this embodiment) will be described with reference to the drawings. The embodiments described below are only one example, and the embodiments to which the present invention is applied are not limited to the following embodiments.

Summary of Embodiment

At first, the summary of the present embodiment is described. In this embodiment, a skill degree providing device is disclosed which provides the skill degree of an operator performing an input or output operation of information using a computer or the like on a daily basis. For example, an adaptive interface providing technique that improves an operation efficiency by an operator can be substantialized by changing an interface in conformity with a skill degree provided by the skill degree providing device. The operator may be referred to as a user.

The proficiency providing device according to the present embodiment collects an operation log for each operator in the backyard and calculates the skill index based on the collected operation log. The calculated skill index can provide an interface of supporting the operator's proficiency for the work task and operator's operation by performing an annotation display for an operation task for an operator having a low skill index, and can be used to improve the operator's proficiency for the work task and the efficiency by providing an interface to enhance an operational efficiency for an operator having a high skill index. Although the skill index is an index of representing the proficiency, the proficiency may be used in the sense of the skill index.

The above-described operation log is, for example, a time interval for a key operation per an event when performing a task, an input order of items, an elapsed time from a certain input item to a next input item, an input content, an error number, and the like. When these operation logs are used, the skill index based on objective evaluation can be obtained.

In addition to the above operation log, the following may be included as operation logs: a key operation (an input, deletion, screen movement, copy, etc.), a mouse operation, an order of input, an overlook of an item (field) that must be entered, and in a case of division of labor, a question to an operator (an operators of a pre-process, an operator of a post-process, etc.) before and after the operation, an inquiry, a request for re-execution of the operation, etc. Regarding the above item that must be entered, the operation log may include a requests for an correlation of an input items that have mutually an interrelationship, such that when an entry is made for one item an entry of another item is judged.

In order to judge the proficiency from the viewpoint of accuracy, for example, the number of times and/or the number of points of correcting by depressing a back space key for each field, page, or operation is obtained as an operation log and used for the judgment. In addition, in order to judge the proficiency from the viewpoint of the accuracy, if there is a person in charge of sharing the work task before and after the person in charge, the operation log shall be obtained as a question to the former person in charge and requests for rework from the latter person in charge so as to be used for the judgment. In addition, in order to judge the proficiency from the viewpoint of the speed, an input time, a time from the end of field input to the next field, a time from the start of field input to the start of input, the movement of the mouse, and the input order of the input are acquired as the operation log and used for the judgment.

When the above-described interfaces are categorized into a support for understanding work task, support for improving operation accuracy, and support for improving operation efficiency, interfaces can be created and assigned according to the skill degree and past operation logs to provide the interfaces according to the skill degree and improve the work efficiency as the whole operator.

(System Configuration)

FIG. 1 illustrates a functional configuration of the skill index provision device 100 according to the present embodiment. As an example, the skill index provision device 100 illustrated in FIG. 1 analyzes the operation log of an operator A and an operator B each performing the same task, calculates the skill index of each operator, and outputs the calculated skill index. Thus, for example, it is possible to improve the task execution efficiency of the entire operator.

As illustrated in FIG. 1, the skill index provision device 100 according to the present embodiment includes operation units 101 and 102, a log analysis unit 200, a skill index storage unit 300, a log file storage unit 500, and a log information analysis data unit 600.

The operation units 101 and 102 are operation units for the operator A and the operator B, respectively, and each includes, for example, a computer keyboard, mouse, and another input device.

The log analysis unit 200 is a function unit which analyzes an operation log of an operator and calculates a skill index of an operator.

The subject of the analysis in this embodiment is a correlation value of a frequency distribution of times between operations, which are correlated with operator's thought, for example, but the number of errors may further be added.

The skill index storage unit 300 is a memory unit that saves the skill index according to the tasks of the operator. The skill index stored in the skill index storage unit 300 is updated when the skill index of the operator is changed. Further, the operator who does not have the skill index (an operator who uses the system for the first time) may be given a skill index of a beginner or the skill index of the operator may be registered in the skill index storage unit 300 in advance. For example, when generating a UI based on a skill index provided by the skill index provision device 100, an operator using the system for the first time can also generate a UI corresponding to the skill index of the corresponding operator by registering the skill index of the corresponding operator in the skill index storage unit 300 beforehand and initially outputting it.

The log file storage unit 500 is a storage unit that temporarily stores an operator operation log, and the operation log is used for the log analysis. The log information analysis data unit 600 stores data used in calculating the skill index of the operator.

(Example of Hardware Configuration)

The skill index provision device 100 described above can be realized, for example, by having a computer execute a program describing the processing contents described in this embodiment.

That is, the skill index provision device 100 can be implemented by executing a program corresponding to a process performed by the skill index provision device 100 using hardware resources such as a CPU and memory built in a computer. The program can be recorded on a computer-readable recording medium (portable memory, etc.), stored or distributed. It is also possible to provide the program via a network, such as the Internet or e-mail.

Figure 2:
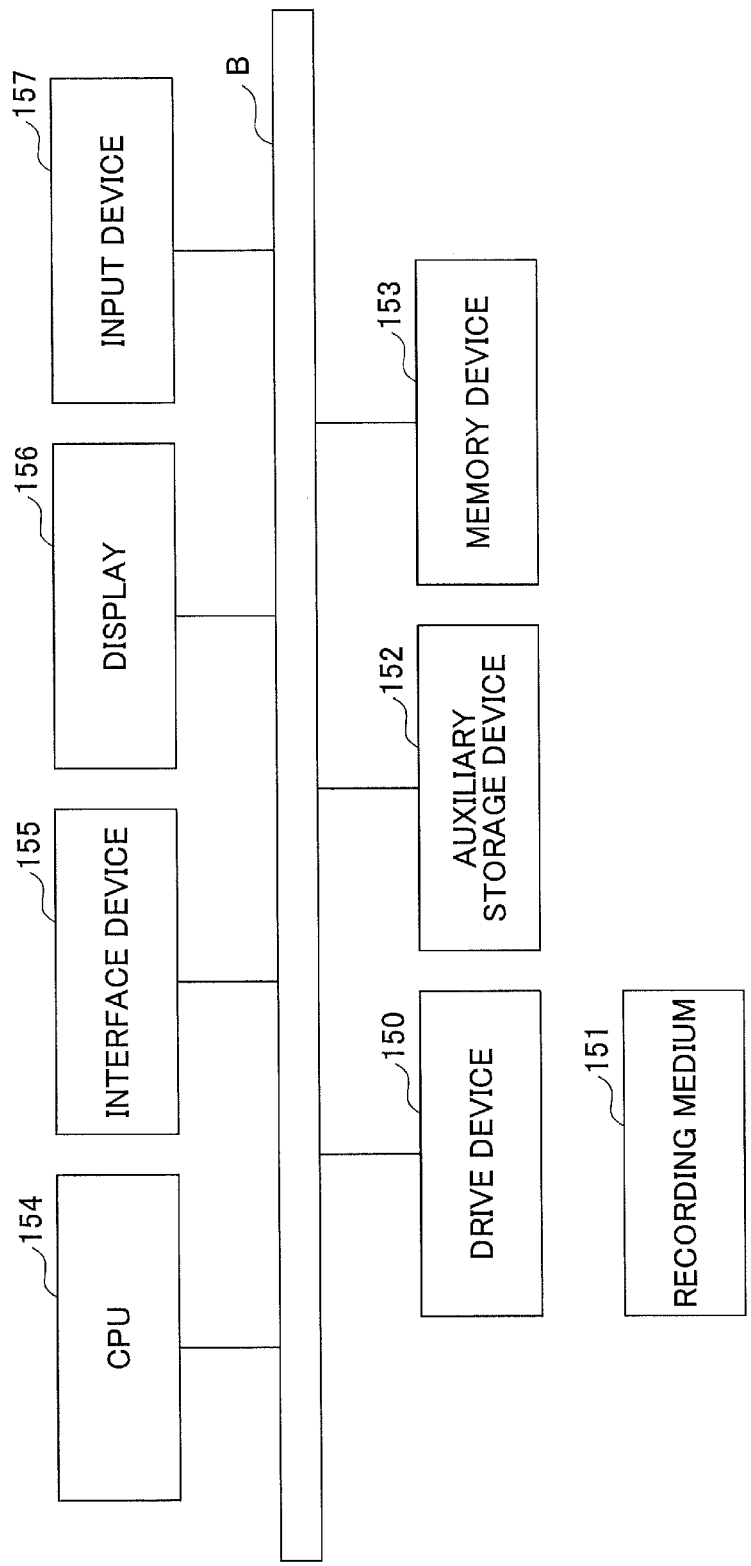
FIG. 2 is a diagram illustrating an example of a hardware configuration of a skill index provision device.

FIG. 2 is a diagram illustrating an example of the hardware configuration of the computer according to the present embodiment. The computer illustrated in FIG. 2 includes a drive device 150 interconnected by a bus B, an auxiliary storage device 152, a memory device 153, a CPU 154, an interface device 155, a display device 156, an input device 157, and the like.

A program for implementing the process by the computer is provided, for example, by a recording medium 151 such as a CD-ROM or memory card. When the recording medium 151 in which the program is stored is set in the drive device 150, the program is installed in the auxiliary storage device 152 from the recording medium 151 through the drive device 150. However, the installation of the program is not necessarily be performed by the recording medium 151, and the program may be downloaded from another computer via the network. The auxiliary storage device 152 stores the installed program and stores necessary files, data, and the like.

The memory device 153 reads out the program from the auxiliary storage device 152 and saves the program when an instruction to start the program is issued. The CPU 154 implements the functions associated with the skill index provision device 100 according to the program stored in the memory device 153. The interface device 155 is used as the interface for connecting to a network.

The display device 156 displays a programmed GUI (Graphical User Interface) or the like. The input device 157 may include a keyboard, mouse, button, touch panel, or the like, and may be used to input various operation instructions. The configuration includes the display device 156 and the input device 157 is an example of the operation unit.

(Example of Operation of Skill Index Device 100)

Figure 3:
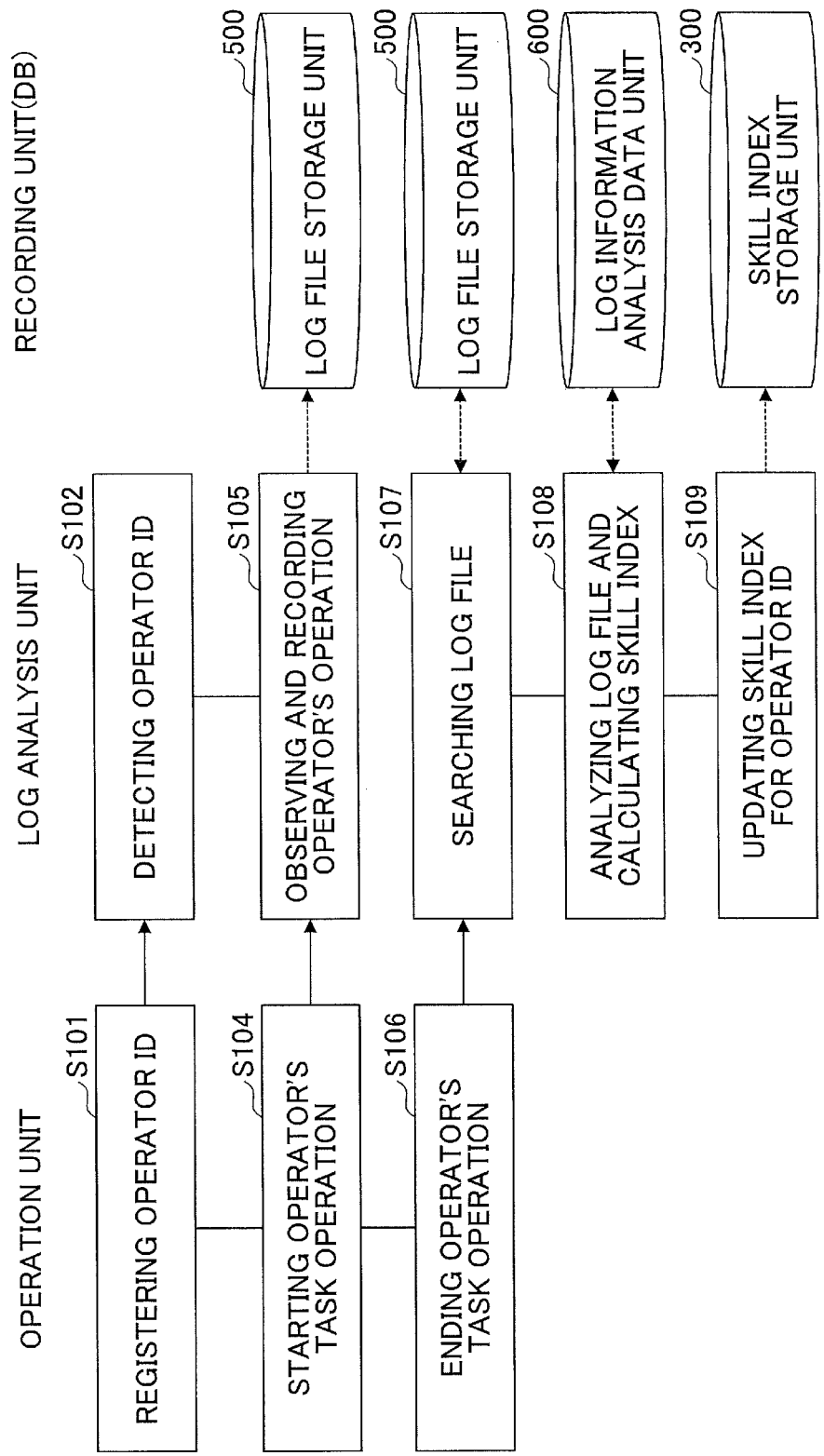
FIG. 3 is a flowchart illustrating the operation of the skill index provision device.

Next, an operation example of the skill index provision device 100 having the functional configuration illustrated in FIG. 1 will be described with reference to the flowchart illustrated in FIG. 3. Hereinafter, as an example, the operation by the operation unit 101 of the operation parts 101 and 102 will be focused on and described.

In S101, an operator registers an ID from the operation unit 101 to the log analysis unit 200.

The log analysis unit 200 detects the operator ID in S102.

Next, the operator starts the task operation in S104, and the log analysis unit 200 observes the operation contents of the operator and stores the operation contents in the log file storage unit 500 in S105.

FIG. 4 illustrates an example of data stored in the log file storage unit 500. As illustrated in FIG. 4, the log file storage unit 500 stores the operator ID, the skill index of the operator, the task ID corresponding to the skill index, the event ID corresponding to the task ID, and the log information (the time interval of the key operation) when the event is executed. As described above, when an event is executed, log information such as key operations (input, deletion, screen movement, copy, etc.), mouse operations, input order, items (fields) that must be entered are overlooked, and in the case of division of labor, questions to the operators (operators of the pre-process and the post-process), inquiries, requests for rework of work, etc. may be stored.

When the operator ends the task in S106, the log analysis unit 200 retrieves the log file that was executed by the operator in S107 using the operator ID as the key, acquires the log file from the log file storage unit 500, and calculates the skill index using the analysis algorithm stored in the log information analysis data unit 600 in S108. The log information analysis data unit 600 stores, for example, an equation for calculating the skill index to be described later. The calculated skill index is stored in the skill index storage unit 300. The skill index stored in the skill index storage unit 300 may be output from the operation unit or output to an administrator terminal or the like via a network.

FIG. 5 illustrates an example of data stored in the skill index storage unit 300. As illustrated in FIG. 5, the skill index storage unit 300 stores the skill index of the task (identified by the task ID) performed by the operator (identified by the operator ID).

For example, a skill index is created based on the frequency distribution of the time between operations by setting an experimental task using spreadsheet software as a task, observing the events (mouse down, key up, etc.) from the start to the end of the task. When keys are operated more than the prejudged number of times for the same event in the frequency distribution, they may be used as sub-information of the skill index as an operation error.

Hereinafter, an example of a skill index calculation method performed by the log analysis unit 200 will be described.

Figure 6:
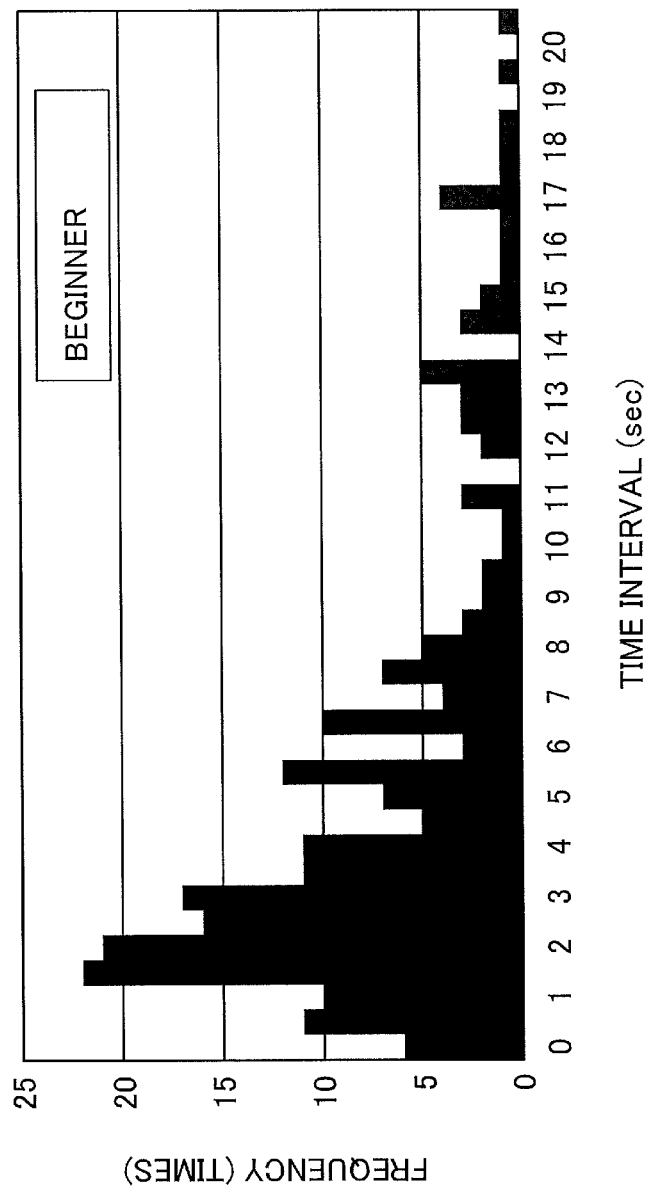
FIG. 6 illustrates an example of a frequency distribution of a time interval between key operations by a beginner.
Figure 7:
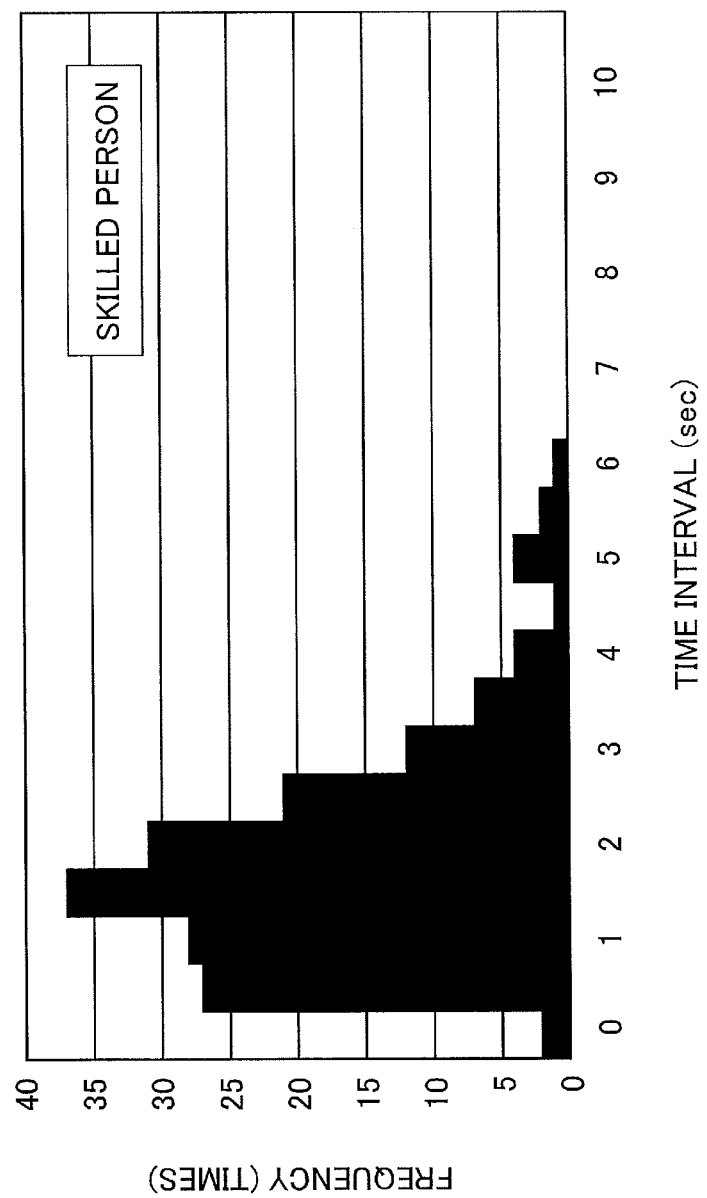
FIG. 7 illustrates a frequency distribution of the time interval between key operations by the skilled person.
Figure 8:
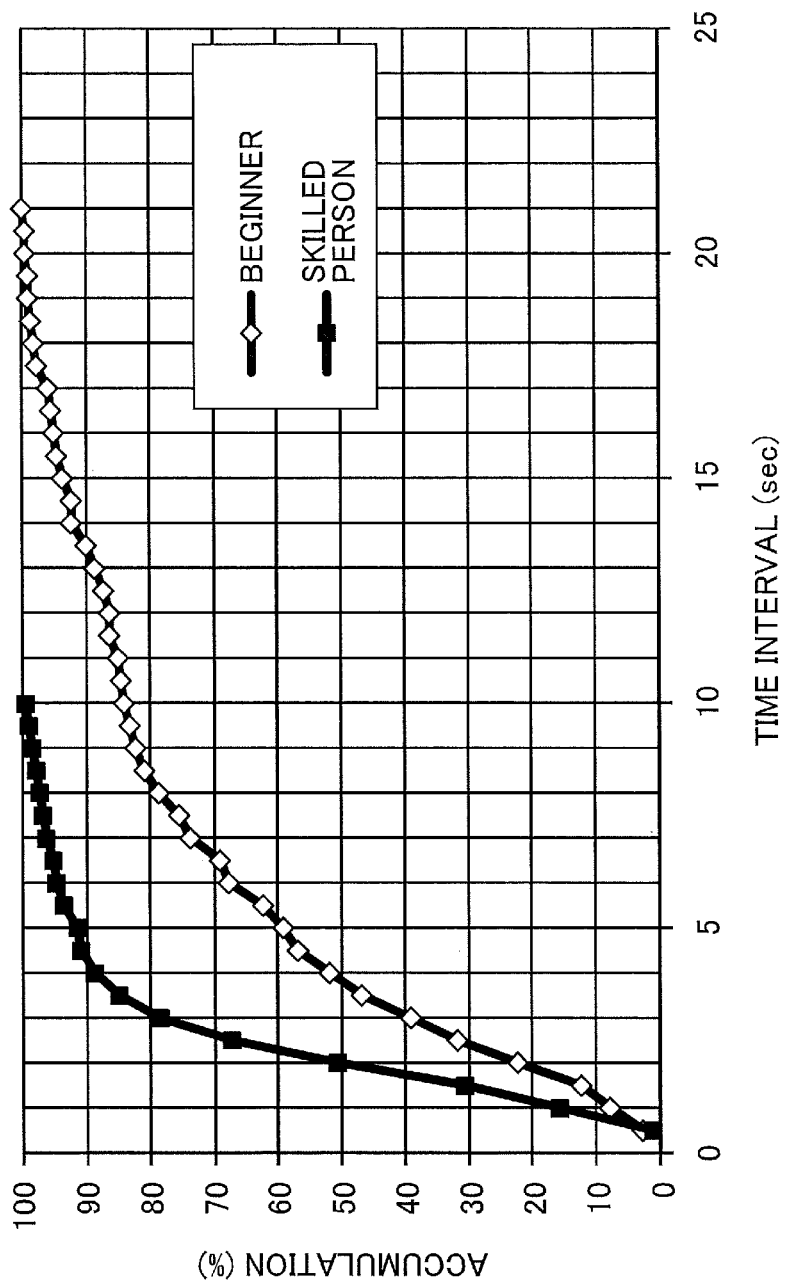
FIG. 8 illustrates an example of cumulative distribution of the time interval between key operations.

In describing how to calculate the skill index, we first describe the frequency distributions of the skilled person and beginner with respect to the time interval of the key operations. FIG. 6 illustrates an example of the frequency distribution of the time interval of the key operation for the beginner. FIG. 7 illustrates an example of the frequency distribution of the time interval of the key operation for the skilled person. FIG. 8 illustrates a cumulative distribution generated based on FIGS. 6 and 7.

From FIG. 8, the differences between the skilled person and the beginner are understood as illustrated in FIG. 9. As illustrated in FIG. 9, the 50% value is 3.7 seconds for the beginner, 2 seconds for the skilled person, the 50% value is 13.5 seconds for the beginner, and 4 seconds for the skilled person. Therefore, in this embodiment, it is judged that the dispersion value is the main parameter for the work efficiency, and the dispersion value V(x) is used as an evaluation scale for the skill index. The dispersion value V(x) is calculated using the following equation (1).

[Formula 1]

$$V(x) = E(x - E(x))^2 = \frac{1}{n}\sum_{i=1}^{n} E(x - E(x))^2 \quad (1)$$

In equation (1) above, V(x) is the dispersion variance of a sample, E(x) is the mean of the sample, and N is the number of samples.

The average value of the samples and the dispersion values calculated using equation (1) are illustrated in FIG. 10 for each of the beginner and the skilled person. If the skill index of the task performed is, for example, a five-point scale, 1 for a dispersion value of 11.8 and 5 for a dispersion value of 4.2, and the skill index is linearly approximated by the dispersion value. The following equation (2) can be obtained as an equation for obtaining the skill index from the dispersion value.

[Formula 2]

$$y = -0.53x + 7.26 \quad (2)$$

In equation (2) above, x is the dispersion value and y is the skill index. For example, if the dispersion value obtained from an operator's operation log is 8, then the operator's skill index is given as 3 (=−0.53×8+7.26).

For example, the log analysis unit 200 periodically calculates the dispersion values for the beginner and the skilled person based on the operation log and updates equation (2).

For equation (2) above, a weighting operation may be performed on the operation log categorized in two terms of accuracy and speed. This can increase the accuracy of estimates when the differences in proficiency are biased toward either accuracy or speed.

The operation log to judge the proficiency from the viewpoint of accuracy include, for example, the times and/or the number of points to be corrected by depressing the backspace per field, per page, or per work task. In addition, the operation log to judge the proficiency from the viewpoint of accuracy include the number of questions asked to the former person in charge, and the number of requests for redoing from the latter person in charge, if any.

On the other hand, the operation logs for judging the proficiency from the viewpoint of speed include, for example, an input time, a time from the end of field input to the transition to the next field, and a time from the transition to the field to the start of input. The information obtained from the movement of the mouse, the order of input, and the like may be numerically converted and used. By using these operation logs to calculate the skill index using equation (3) below.

[Formula 3]

$$y = \alpha x1 + \beta x2 + \gamma \quad (3)$$

In equation (3) above, x1 is the dispersion value of a log related to the accuracy (e.g. the number of times to correct by depressing the backspace per page), x2 is the dispersion value of a log related to a speed (e.g. input time), and y is the skill index. $\alpha$ and $\beta$ are weighting factors and $\gamma$ is a constant.

As in Equation (2), Equation (3) above can be obtained as an equation approximating the relationship between the dispersion value of the operation log by the beginner and the dispersion value of the operation log by the skilled person.

The skill index (proficiency) described above is an example. Examples a to d below are described as an example of calculation methods other than the above-described calculation method of the skill index. Examples a to d can be applied in any combination. Example a through d may also be applied in conjunction with a method for calculating the aforementioned skill index.

Example a) In Example a, an operation log of an extremely skilled person (both high accuracy and efficiency) is retained in the log file storage unit 500 as a best practice, and the log analysis unit 200 judges the proficiency of the operator by comparing the operation log of the operator subjected to be proficiency judgement with the best practice.

In this case, a method in which the log analysis unit 200 compares each input item (one field) to judge the proficiency and a method in which the proficiency is compared for each screen (one page) to judge the proficiency is used. In addition, because the error occurs for one item/one screen, the log analysis unit 200 may judge the proficiency by comprehensively evaluating the comparison results of the most recent n screen operations and the item operations.

In order to judge the proficiency by considering the most recent n operations, a method of averaging the comparison result of the previous n operations logs, previous (n−1) operations logs, and the previous (n−2) operations log may be used, or a method of taking a weighted average by lowering the weighting of the comparison result from the previous n operations logs to the previous 1 operations log may be used.

Example b) In Example b, the best practices described in Example a are stored in the log file storage unit 500 as the default settings. However, as the operator's operation logs are stored in the log file storage unit 500, the best practices are dynamically overwritten (replaced) when the accurate and efficient operation log of the highly skilled person exceeding the default best practices can be obtained, and the proficiency is calculated based on the best practices after the overwriting.

Example c) In Example c, while the operator's operation log is stored in the log file storage unit 500 without setting the best practice, the log analysis unit 200 learns the relationship between the factors affecting the learning from the operation log and the proficiency, and automatically judges the proficiency using the learning model obtained by learning. Example c may be applied in combination with methods using best practices.

Specifically, the operation log of the skilled person and the operation log of the beginner are provided to the log analysis unit 200 as the teacher data, the log analysis unit 200 creates a learning model by learning using the DNN (Deep Neural Network) based on the teacher data, and stores the learning model in the log information analysis data unit 600. Thereafter, the log analysis unit 200 outputs the proficiency by inputting the operation log of the operator to be judged into the learning model.

Example d) It is assumed that an operation work task operated based on a user request will be subjected to the proficiency on two axes: proficiency with the system and proficiency for the work task. In Example d, proficiency is judged based on these assumptions.

Specifically, the log analysis unit 200 uses an input speed, interval to start the input, mouse trajectory, and the like as the material for judging the proficiency from the operation log, and the time interval as an input order, the degree of covering a requisite input item, questions and remands to the pre-processing person when preprocessing is required, questions and remands from the post-processing person when there is a post-processing person, and the like.

The log analysis unit 200 uses these judgment materials to calculate the proficiency for the system and the proficiency for the work task, respectively, by the aforementioned skill index calculation method of calculating the skill index (e.g., comparison with best practice). As an example, the best practice input speed is compared to the operator's input speed to calculate the proficiency for the system based on a difference.

In addition, as an example, the input order of the best practice is compared with the input order of the operation to be judged, and the proficiency is calculated based on the average value of the order that becomes different from the input order of the best practice.

Figure 11:
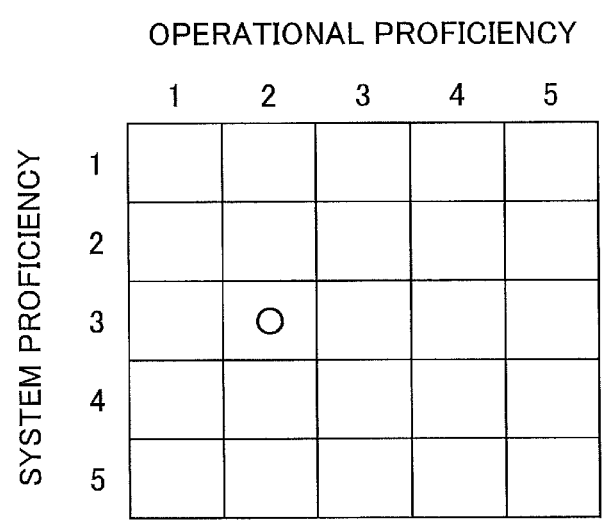
FIG. 11 is a diagram illustrating an example of the matrix of the system proficiency and work task proficiency.

For example, the log analysis unit 200 performs mapping of the judged system proficiency and work proficiency to the matrix (illustrated in FIG. 11) on a matrix having the system proficiency as the vertical axis and the work task proficiency as the horizontal axis. In the example of FIG. 11, for example, the data of system proficiency=3 and the work task proficiency=2 are mapped.

A number of proficiency processes are possible from a low-low state to a high-high state from the top left corner to the bottom and/or the right in FIG. 11, and the shortest proficiency process can be substantialized by an appropriate annotation of the interface according to each process.

Next, in S109, the log analysis unit 200 updates the contents of the skill index storage unit 300 for the corresponding operator using the calculated skill index value.

(Provision of Interface Using Skill Index)

Figure 12:
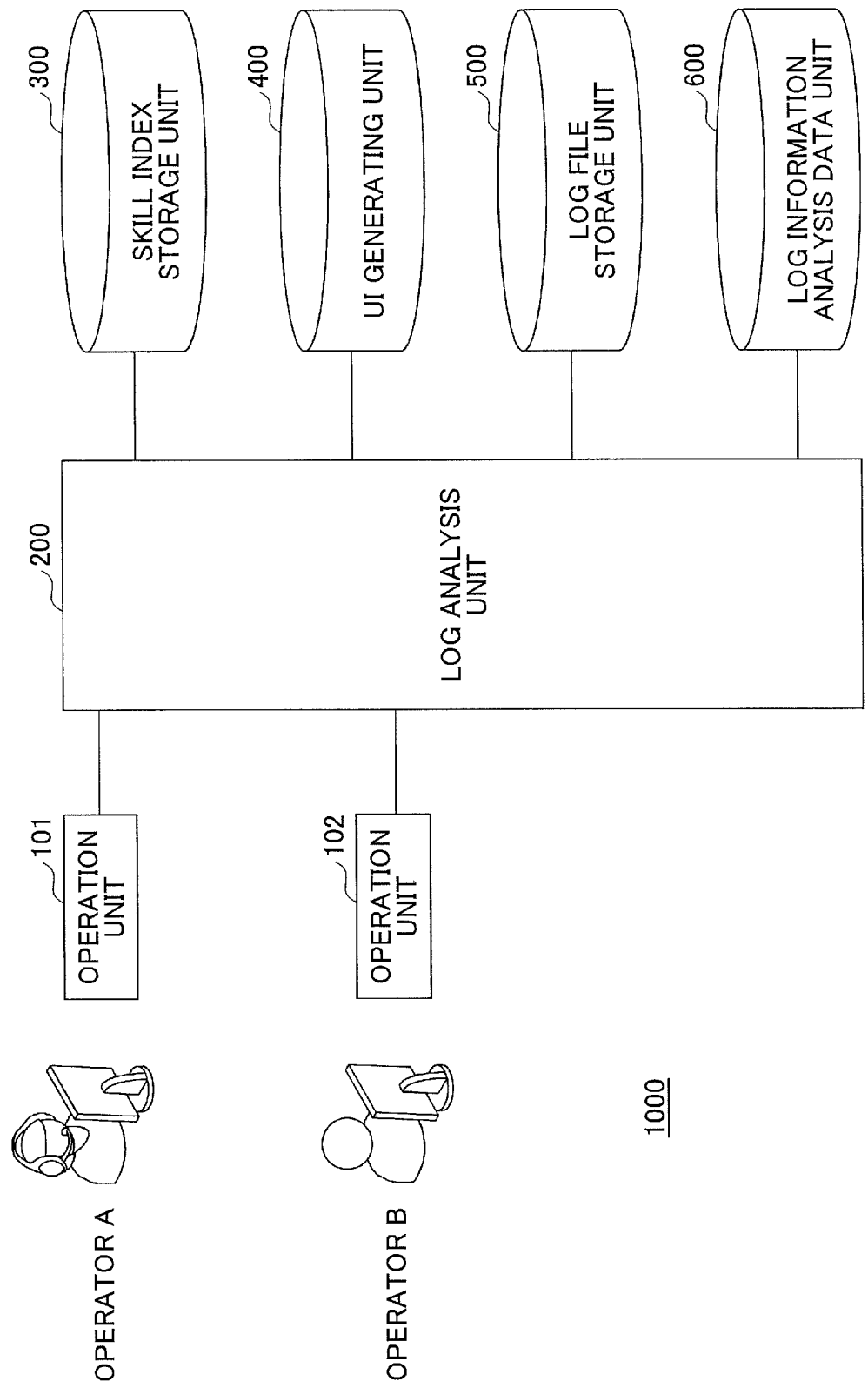
FIG. 12 illustrates a structure of an adaptive interface providing device.
Figure 13:
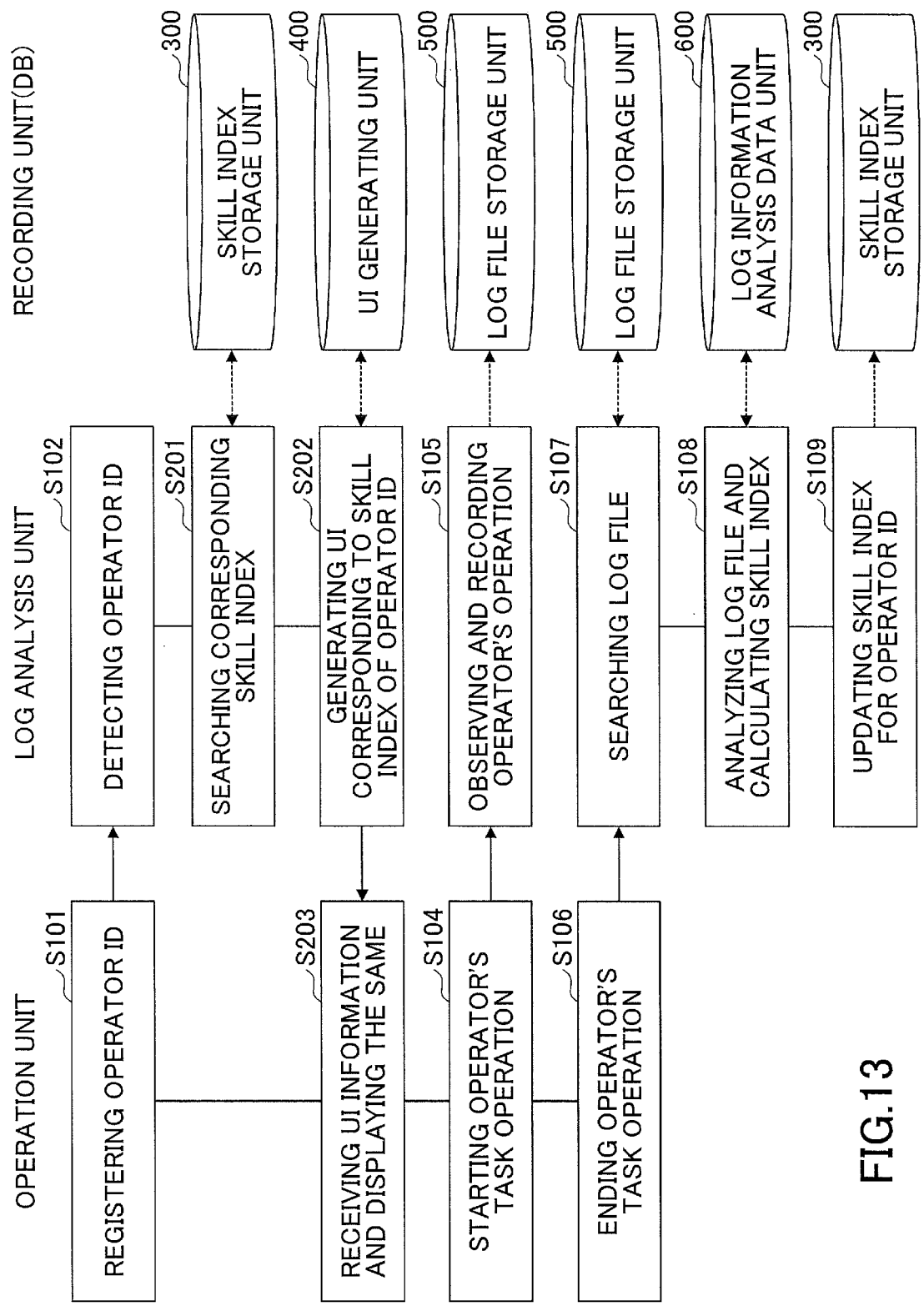
FIG. 13 is a flowchart for explaining an operation of an adaptive interface providing device.

FIG. 12 illustrates a functional configuration of the adaptive interface providing device 1000 that provides an appropriate interface to the operator using the skilled index provided by the embodiment described above. FIG. 13 is a flowchart illustrating an operation of the adaptive interface providing device 1000. A portion which performs the same operation as that of the above-described embodiment is omitted from the explanation.

The adaptive interface providing device 1000 includes operation units 101 and 102, a log analysis unit 200, a skill index storage unit 300, a UI generation unit 400, a log file storage unit 500, and a log information analysis data unit 600. The UI generation unit 400 is a functional unit that generates a UI corresponding to the skill index.

An operation will be described with reference to FIG. 13. In S101, the operator registers an ID from the operation unit 101 to the log analysis unit 200. The log analysis unit 200 detects the operator ID in S102 and retrieves and acquires the skill index corresponding to the operator ID from the skill index storage unit 300 in S201. A new operator who does not have the skill index (an operator who uses the system for the first time) may be given the skill index for the beginner, or the skill index of a corresponding operator may be registered in the skill index storage unit 300 in advance. By registering the skill index of the corresponding operator in the skill index storage unit 300 in advance, an operator using the system for the first time can generate a UI corresponding to the skill index of the corresponding operator.

In S202, the log analysis unit 200 causes the UI generation unit 400 to generate the interface corresponding to the skill index of the operator ID, and the generated interface is displayed on the operation unit 101 in S203.

FIG. 14 illustrates an example of data retained by the UI generation unit 400. As illustrated in FIG. 14, the UI generation unit 400 retains the UI type corresponding to the skill index. Accordingly, the UI generation unit 400 generates the UI having a characteristic corresponding to the skill index of the operator designated from the log analysis unit 200. As will be described later, the UI generation unit 400 generates an interface candidate group from an operator's operation log stored in the log file storage unit 500, judges the interface corresponding to the skill index from among the candidate group, and the interface is displayed on the operation unit 101.

The example shown in FIG. 14 is an example of a task that receives order information from a customer and inputs its contents. In FIG. 14, the UI feature for each UI type are illustrated. For example, the above-described candidate group is classified into three types of UI1 to UI3 in the example illustrated in FIG. 14, and the UI generation unit 400 judges the candidate corresponding to the skill index of the operator as the interface to be used.

As illustrated in FIG. 14, the UI1 is a UI that causes the skill index to be displayed on one operator, including, for example, content (description of the meaning of the input item) that aids in understanding the work task. The UI2 is a UI in which a skill index is displayed on the operator with a value of 2, and includes, for example, content (e.g., input, correlation with other inputs) that aids in improving the operational accuracy. The UI3 is a UI that allows the operator with a skill index of 3 to display, for example, content (input aid, input sequence change) that aids in improving operation efficiency. The content of the UI are defined for each task performed by the operator.

In the flow of FIG. 13, S104 through S109, the skill index is calculated and updated as previously described.

In the following operation, the latest skill index after the update is used to select the interface. For example, if a pre-update proficiency index is 3 and a post-update proficiency index is 4-5, a more difficult interface is set, and if the post-update proficiency index is 1-2, a less difficult interface is set. The current interface is set in a case where the skill index is 3.

Hereinafter, the first and second embodiments will be described as a more detailed example of the interface displayed on the operation unit 101. A third embodiment will also be described as an example of a method for generating the interface related to the first and second embodiment. Fourth and fifth embodiment will be described as other examples. It should be noted that the first to fifth embodiments can be applied in any combination. Any of the processes described in the first to fifth embodiments can be applied in combination with the processing of the adaptive interface providing device 1000 described above.

First Embodiment

In the first embodiment, the annotation will be described as an example of the interface displayed on the operation unit 101 in S203 in the flow of FIG. 13.

In the first embodiment, the UI generation unit 400 substantializes the adaptive interface to be displayed on the operator by adding the annotation without changing the target interface. This method has an advantage of allowing all operators to use the base interface in common without modifying the system with the target interface.

Specific annotations include, for example, adding an appendix to input an item if they support understanding of the work task, highlighting an input requisite item if it supports an improvement of operation accuracy, and listing an input item if it improves the operation efficiency.

Second Embodiment

In the second embodiment, as an example of the UI displayed on the operation unit 101 in S203 in the flow of FIG. 13, a change in the interface will be described.

Within the second embodiment, the UI generation unit 400 indirectly inputs to a target interface by changing the target interface and causing the operator to input the input from the interface after changing the interface. This provides the adaptive interface to be displayed to the operator. This method has the advantage of enabling layout-level optimization for each operator.

A specific post-change interface includes, for example, an addition of a precautionary statement if it supports the understanding of the work task, an addition of automatic input function if it supports the improvement of the operation accuracy, and a change in the display order if it improves operation efficiency.

Third Embodiment

The UI generation unit 400 judges the candidate of the annotation in the first and second embodiments or the candidate of the content of the interface change by the past operation log.

For example, in a case of adding a tag of an input item or adding a precautionary statement, the UI generation unit 400 detects an area in which the operator tends to stop or is prone to error based on the elapsed time from a certain input item to the next input item, the number of errors, or the like, and judges these parts as a display area of a tag or a precautionary statement.

For example, in the case of highlighting an input mandatory item or adding an automatic input function, the UI generation unit 400 analyzes the input content of the item and the correlation from the input order and discovers the item that is always the same as an input item, an item that is required to be input depending on the input content of another item, or an item in which the input content is automatically judged. The UI generation unit 400 can display highlight of the input requisite item or add automatic input function to the found items.

For example, the UI generation unit 400 judges the option of listing the input contents of the input item from the aggregation thereof in a case of listing the input item. For example, the UI generation unit 400 judges the change of the display order by the input order.

The UI generation unit 400 calculates and learns the content of the above-described annotation or the change of the interface based on the operation log of all operators that record the operation log. This reduces the impact of individual habits and mistakes and enables the collection of operation logs in a short time.

A candidate group of the above-described annotation or interface changes generated by the operation log is retained by the UI generation unit 400, and the UI generation unit 400 judges what should be provided to the operator by an operator's skill index. Candidate groups are updated sequentially as operation logs are accumulated. That is, the interface to be displayed to the operator is dynamically generated.

Fourth Embodiment

As a further embodiment, the annotation with the fastest (effective) improvement in the skill index may be found and displayed by learning from a number of operating logs.

Specifically, the log analysis unit 200 extracts from the operator's operation log stored in the log file storage unit 500 the factors that affect the operator's proficiency (the operation takes a long time, the operation has been repeated, etc.), and the UI generation unit 400 searches for the most effective interface (for example, the annotation) for the improvement of the extracted factors by learning based on the past data of the combination of the operation log and the interface (for example, the annotation) presented in the past for the extracted factors, and displays the interface (for example, the annotation) thereafter.

The annotation includes, for example, that are displayed in advance, that is displayed at the time it wants to be alerted, that is displayed when a mouse or an attention (such as eye movement) is moved to a certain location, that indicates the order of input, that indicates the item (field) that must be entered, and that uses free description that frequently occur. For example, coloring, numbering, enclosing, or changing the size of a field to make it conspicuous.

Fifth Embodiment

The content to be displayed is not retained in the UI generation unit 400 in advance, but an input rule may be derived from the operation log stored in the log file storage unit 500 by the log analysis unit 200 and the display content may be generated according to the content thereof.

Specifically, at first, the log analysis unit 200 extracts an input rule from the operation log of the operator stored in the log file storage unit 500. Such input rule includes, for example, "many people enter numbers in this field", "many people enter 9-digit numbers in this field", "another field is requisitely input when you enter into one field", "when one input is A, there is a correlation that an input of another field becomes B", etc.

The UI generation unit 400 generates a display content according to the input rule extracted from the operation log and displays the generated display content on the operation unit 101. The display content generated by the UI generation unit 400 may be referred to as an "interface".

The UI generation unit 400 generates a display content such as a warning in advance that the input of this field is often 9 digits in response to the input rule in which many people input 9 digits in the field, or a warning in which there is a number of digits in case there is a non-9 digit input in this field.

The UI generation unit 400 generates a display content such as a warning in advance that the input is highly likely to be B in the input rule in which the input into one field is A and the input in another field is B, or a warning in advance that this input is highly likely to be B in the other field, or a warning in advance that this input is not B when the input is not B.

Depending on the input rule, for example, the fourth embodiment may be applied to produce the display content with the earliest improvement in the skill index due to learning.

Summary of Embodiments

As described above, according to the present embodiment, the skill index provision device for calculating the skill index of the user based on the user's operation log, including a memory unit for saving a user's operation log, an operation log related to the accuracy of the operation of a key depressed by a user, and the skill index calculation unit for calculating the skill index based on a dispersion value of each of the operation log related to the speed of key operation.

The skill index calculation unit may calculate the skill index of the user using a relation equation between the skill index and the dispersion value obtained from the dispersion value of the operation log by the beginner and the dispersion value of the operation log by the skilled person.

The skill index calculation unit may calculate the skill index based on a comparison of the operation log of the user and the operation log of the highly skilled user.

The skill index calculation unit may learn a relationship between a factor affecting the proficiency from the operation log and the skill index, and calculates the skill index using a learning model obtained by learning.

The skill index calculation unit may calculate, as the skill index, a skill index for the system and a skill index for the work task.

In addition, according to the present embodiment, the skill index providing method is provided which is performed by the skill index provision device which calculates the skill index of the user based on the operation log of the user stored in the memory unit, including the operation log related to the accuracy of operation of a key performed by the user, and the skill index calculating step for calculating the skill index based on the dispersion value of each of the operation logs related to the operation speed of the key.

The description discloses at least the following:
(First Aspect)

A disclosed technique provides a skill index provision device for calculating a skill index of a user based on an operation log of a user, the skill index provision device including
   a memory unit for saving the operation log of the user, and
     a skill index calculation unit for calculating the skill index based on the operation log related to an accuracy of operating a key depressed by the user and a dispersion value of each of the operation log related to a speed of operating a key.

The log file storage unit 500 is an example of a memory unit, and the log analysis unit 200 is an example of a skill index calculation unit.
(Second Aspect)

The skill index calculation unit calculates the skill index of the user using a relation equation of the relationship between the skill index and a dispersion value obtained from the dispersion value of the operation log by a beginner and the dispersion value of the operation log by the skilled person.
(Third Aspect)

The skill index provision device according to the first or second aspect, wherein the skill index calculation unit calculates the skill index based on a comparison between the operation log of the user and the operation log of a user having a high skill.
(Fourth Aspect)

The skill index provision device according to any one of the first to third aspects, wherein the skill index calculation unit learns from the operation log a relationship between a factor affecting proficiency and the skill index, and calculates the skill index using a learning model obtained by the learning.
(Fifth Aspect)

The skill index provision device according to any one of the first to third aspects, wherein the skill index calculation unit calculates, as the skill index, a skill index for a system and a skill index for a work task.
(Sixth Aspect)

A skill index provision method implemented by the skill index provision device which calculates a skill index of the user based on the operation log of the user stored in the memory unit, the skill index provision method includes a skill index calculation step of calculating the skilled index based on the dispersion values of the operation log related to an accuracy of operating the key performed by the user and the operation log relating to the speed of operation of the key
(Seventh Aspect)

A program for making a computer function as a skill index calculation unit in the skill index provision device according to any one of the first to fifth aspects.

Although the present embodiment has been described above, the present invention is not limited to such specific embodiments, and various modifications and modifications are possible within the scope of the present invention as claimed.

This patent application claims priority to Japanese Patent Application No. 2018-200332 filed in Oct. 24, 2018. The entire contents of Japanese Patent Application No. 2018-200332 are hereby incorporated by reference.

DESCRIPTION OF SYMBOLS

100: Skill index provision device
1000: Adaptive interface providing device
101, 102: Operation unit
200: Log analysis unit
300: Skill index storage unit
400: UI generation unit
500: Log file storage unit
600: Log information analysis data unit
150: Drive device
151: Recording medium
152: Auxiliary storage device
153: Memory device
154: CPU
155: Interface device
156: Display device
157: Input device

What is claimed is:

1. A skill index provision device for calculating a skill index of a user based on an operation log of the user, the skill index provision device comprising:
at least one processor; and
at least one memory configured for saving the operation log of the user, and storing program instructions that cause the at least one processor to:
receive a signal from an application, the signal indicating an end of an operation using an interactive computer user interface of a task of a user, wherein the task includes user operations of keys in the interactive computer user interface of the task, and the operation log of the user stores the user operations of the keys;
calculate the skill index of the user, based on the operation log, wherein the skill index is based at least in part on an accuracy of operations comprising operating a key depressed by the user to correct a previous operation by the user and a dispersion value of a speed of operating a key by the user relative to a predetermined speed, the skill index is further based at least in part on a system proficiency index and a work task proficiency index, and the calculating the skill index of the user further comprises:
calculating, the system proficiency index of the user operating the interactive computer user interface and the work task proficiency index of the user operating the interactive computer user interface, wherein the system proficiency index is based at least on the dispersion value of a speed of operating a key, and the work task proficiency index is based at least on the accuracy of operations comprising operating a key depressed by the user to correct a previous operation by the user; and
mapping the calculated system proficiency index and the calculated work task proficiency index to a matrix, wherein the matrix comprises a first axis of the system proficiency index and a second axis of the work task proficiency index of the user operating the interactive computer user interface, and the first axis is distinct from the second axis; and
determining, based on the mapped matrix, a shortened proficiency process of the user operating the interactive computer user interface, wherein the shortened proficiency process comprises one or more interactive computer user interfaces with annotation displayed near an input field, the annotation represents an instruction to operate a key to input information in the input field according to a proficiency of the user performing the task as specified in the mapped matrix; and
dynamically modify, based on the skill index and the mapped matrix, the interactive computer user interface of the task of the user according to the one or more interactive computer user interfaces for improving proficiency of the user performing the task; and
present the dynamically modified interactive computer user interface of the task of the user to interactively receive a further key input through the dynamically modified interactive computer user interface.

2. The skill index provision device according to claim 1, wherein the calculating the skill index of the user uses a relation equation between the skill index and a first dispersion value of the operation log obtained from a second dispersion value of the operation log by a beginner and a third dispersion value of the operation log by a skilled person.

3. The skill index provision device according to claim 1, wherein the calculating the skill index is based on a comparison of a first operation log of the user and a second operation log of a highly skilled user.

4. The skill index provision device according to claim 1, wherein program instructions cause the at least one processor to:
learn from the operation log a relationship between a factor affecting proficiency and the skill index, and
calculate the skill index using a learning model obtained by the learning.

5. The skill index provision device according to claim 1, wherein the calculating the skill index of the user further comprises calculating a skill index for a system and a skill index for a work.

6. A skill index provision method implemented by a skill index provision device which calculates a skill index of a user based on an operation log of a user stored in a memory, the method comprising:
receiving a signal from an application, the signal indicating an end of an operation using an interactive computer user interface of a task of a user, wherein the task includes user operations of keys in the interactive computer user interface of the task, and the operation log of the user stores the user operations of the keys;
calculating skilled index of the user, based on a dispersion value of the operation log, wherein the skill index is based at least in part on an accuracy of operations comprising operating the key performed by the user to correct a previous operation by the user and a dispersion value of to a speed of operating the key by the user relative to a predetermined speed, the skill index is further based at least in part on a system proficiency index and a work task proficiency index, and the calculating the skill index of the user further comprises:
calculating the system proficiency index of the user operating the interactive computer user interface and the work task proficiency index of the user operating the interactive computer user interface, wherein the system proficiency index is based at least on the dispersion value of a speed of operating a key, and the work task proficiency index is based at least on the accuracy of operations comprising operating a key depressed by the user to correct a previous operation by the user; and
mapping the calculated system proficiency index and the calculated work task proficiency index to a matrix, wherein the matrix comprises a first axis of the system proficiency index and a second axis of the work task proficiency index of the user operating the interactive computer user interface, and the first axis is distinct from the second axis; and
determining, based on the mapped matrix, a shortened proficiency process of the user operating the interactive computer user interface, wherein the shortened proficiency process comprises one or more interactive computer user interfaces with annotation displayed near an input field, the annotation represents an instruction to operate a key to input information in the input field according to a proficiency of the user performing the task as specified in the mapped matrix; and
dynamically modify, based on the skill index and the mapped matrix, the interactive computer user interface of the task of the user according to the one or more interactive computer user interfaces for improving proficiency of the user performing the task; and presenting the dynamically modified interactive computer user interface of the task of the user to interactively receive a further key input through the dynamically modified interactive computer user interface.

7. A non-transitory computer-readable recording medium that stores a program for making a computer function in a skill index provision device for calculating a skill index of a user based on an operation log of the user, the skill index provision device including:
at least one processor; and
at least one memory configured for saving an operation log of the user, and storing program instructions that cause the at least one processor to:
receive a signal from an application, the signal indicating an end of an operation using an interactive computer user interface of a task of a user, wherein the task includes user operations of keys in the interactive computer user interface of the task, and the operation log of the user stores the user operations of the keys;
calculate the skill index of the user, based on the operation log, wherein the skill index is based at least in part on an accuracy of operations comprising operating a key depressed by the user to correct a previous operation by the user and a dispersion value of a speed of operating a key by the user relative to a predetermined speed, the skill index is further based at least in part on a system proficiency index and a work task proficiency index, and the calculating the skill index of the user further comprises:
calculating, the system proficiency index of the user operating the interactive computer user interface and the work task proficiency index of the user operating the interactive computer user interface, wherein the system proficiency index is based at least on the dispersion value of a speed of operating a key, and the work task proficiency index is based at least on the accuracy of operations comprising operating a key depressed by the user to correct a previous operation by the user; and
mapping the calculated system proficiency index and the calculated work task proficiency index to a matrix, wherein the matrix comprises a first axis of the system proficiency index and a second axis of the work task proficiency index of the user operating the interactive computer user interface, and the first axis is distinct from the second axis; and
determining, based on the mapped matrix, a shortened proficiency process of the user operating the interactive computer user interface, wherein the shortened proficiency process comprises one or more interactive computer user interfaces with annotation displayed near an input field, the annotation represents an instruction to operate a key to input information in the input field according to a proficiency of the user performing the task as specified in the mapped matrix; and
dynamically modify, based on the skill index and the mapped matrix, the interactive computer user interface of the task of the user according to the one or more interactive computer user interfaces for improving proficiency of the user performing the task; and
present the dynamically modified interactive computer user interface of the task of the user to interactively receive a further key input through the dynamically modified interactive computer user interface.

8. The skill index provision device according to claim 1, wherein the program instructions cause the at least one processor to provide an annotation for a proficiency process of the system proficiency index and the work task proficiency index, both of which are mapped on the matrix, to an interface displayed to the user.

* * * * *